Aug. 11, 1925.

C. A. SWANSON 1,549,162

DIRECTION STOP FOR SPOTLIGHTS

Filed June 21, 1923

WITNESS
Loie E. Condé

INVENTOR
Carl A. Swanson.
By Wilson & McCanna
ATTYS.

Patented Aug. 11, 1925.

1,549,162

UNITED STATES PATENT OFFICE.

CARL A. SWANSON, OF ROCKFORD, ILLINOIS, ASSIGNOR TO ROCKFORD AUTO PRODUCTS COMPANY, OF ROCKFORD, ILLINOIS, A CORPORATION OF ILLINOIS.

DIRECTION STOP FOR SPOTLIGHTS.

Application filed June 21, 1923. Serial No. 646,756.

*To all whom it may concern:*

Be it known that I, CARL A. SWANSON, a citizen of the United States, residing at Rockford, in the county of Winnebago and State of Illinois, have invented certain new and useful Improvements in Direction Stops for Spotlights, of which the following is a specification.

This invention pertains to headlights for motor vehicles, and has more particular reference to so-called spot lights adapted to be mounted on the upper body structure and being manually operable or adjustable for changing the direction of the rays. These spot lights throw intense rays of light and by adjustment may be directed or set for illuminating the road bed in front of the vehicle, or the outer edge or side of the road bed, or signs or other objects along the road. Such intense rays are, however, dangerous, and not infrequently the cause of accidents, due to improper setting of the spot light so that its rays are directed in the face of an approaching driver.

The object of the present invention is to provide means for preventing movement of a spot light in the objectionable manner mentioned, but permitting freedom of movement to take care of the needs for which a spot light of this character is primarily intended. To this end, I have provided a simple means for preventing the spot light from being turned so as to direct its rays above a predetermined level at the left of the straight-ahead position, viewed from the vehicle on which a spot light is mounted, and permitting the rays to be directed upwardly at the right of said position, for the purpose of illuminating signs and other objects at this side of the vehicle.

Referring to the drawings,—

Figure 1:
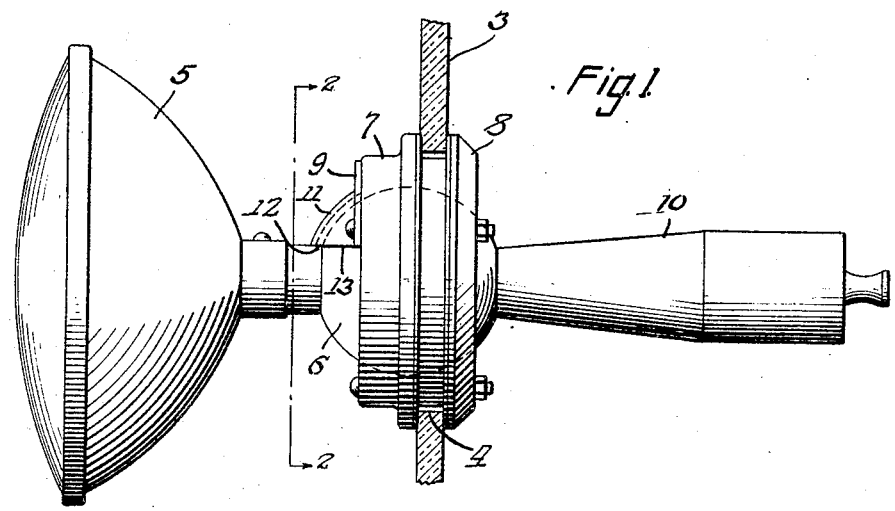
Figure 1 is a side elevation of a spot light embodying my invention.
Figure 2:
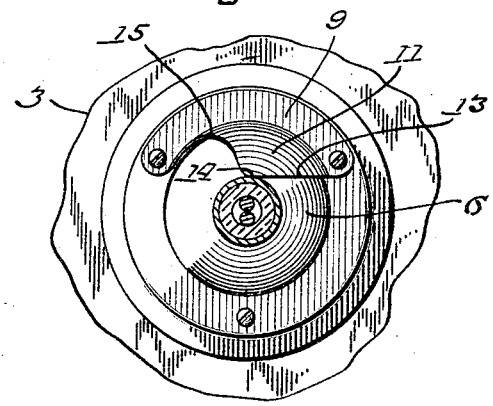
Fig. 2 is a sectional view taken on the line 2—2 of Fig. 1.

My improvement is applicable to the mounting of any headlight or spot light which is capable of adjustment for changing the direction of the rays, but in its preferred form is applied to a spot light of the kind mounted on the upper structure of a motor vehicle and movable by an occupant of the vehicle. It is customary to mount these spot lights either at the exterior of the vehicle body, or at a position in which the electric lamp is on the outer side of the body and a handle therefor is disposed on the inner side for changing the position of the lamp from the interior of the body.

In the example shown in the drawing, the spot light is mounted on a windshield 3. This supporting part has an opening 4 therethrough, and the spot light extends through said opening. In this instance, the electric lamp designated generally by 5, is carried by a spherical member 6, which also carries a handle 10 diametrically opposite from the lamp. The spherical member has a bearing upon and within the members 7 and 8 which are clamped to opposite sides of the windshield 3, and by manipulation of the handle 7 said spherical member may be moved universally on its bearing mounting for changing the direction of the lamp 5.

In the present embodiment of my invention, the means for limiting the range of movement of the lamp is carried in a stationary postion by the member 7. This means may be integral with said member or in the form of a plate designated generally by 9, attached thereto as shown. This plate has a spherical portion 11 over-reaching the spherical member 6 and is shaped on its lower edge to provide an abutment or stop adapted to be engaged by the top edge 12 of the lamp socket for limiting upward movement of the lamp. This edge 13 in a horizontally disposed position, reaches from the extreme left hand side to a fore-and-aft vertical plane intersecting the center of the spherical member, as indicated at the point 14, and is thence curved upwardly as at 15 at the right hand side, the words "Left" and "Right" being used as looking forwardly on the vehicle.

The lamp is shown in the drawing in the straight-ahead position, that is, parallel with the direction of travel of the vehicle. By reason of the present construction, the lamp may be turned to the left and downwardly as for illuminating the road bed ahead and at the left hand side of the vehicle, but is prevented from movement upwardly by the edge 13 of the guide or stop, consequently, preventing the intense rays from being directed to an approaching driver on the left. The edge 13 defines and limits the course of movement of the spot light in its uppermost position at the left hand side of the vehicle. It will be observed that the position of the edge 13 in merely relative to the mounting of the spot light and to the construction of the particular mounting, the purpose of this edge or the equivalent being to prevent the spot light from being directed above a danger point. This stop means should, however, permit free movement and adjustment of the lamp both horizontally and vertically below such danger line and considerably thereabove at the right hand side of the vehicle in order that the lamp or spot light may be utilized to the fullest advantage. It follows, therefore, that when applying the invention to a spot light of the character disclosed herein, the location of the edge 13 with respect to the stationary part 7 is dependent on whether said part 7 is mounted in a vertical or inclined position, since if the part 7 is inclined backwardly, the edge 13 will be disposed at a lower position. The location and shape of the stop means will, therefore, be governed largely by the particular construction and mountng of the head light or spot light. It will be manifest in the present instance that the edge 13 might be located at a lower position in order to limit the rays to a more pronounced downward incline and that the edge 15 might be shaped to give more or less freedom of action in directing the rays at the other side of the vehicle.

I claim:

The combination of a vehicle spot light carried by a spherical member, supporting means in which said spherical member is mounted for universal movement, and a stop operative between said supporting means and the spot light-carrying means for limiting movement of the latter above a danger point at one side of the vehicle, said stop comprising a plate secured to said supporting means above said spherical member and having a spherical portion fitting over said spherical member and provided at one side of the center with a horizontally disposed abutment surface and at the opposite side with an upwardly curved abutment surface, said spotlight-carrying means being adapted to engage said abutment surfaces for limiting direction of the rays.

CARL A. SWANSON.